(12) United States Patent
Fujiwara et al.

(10) Patent No.: US 6,328,474 B1
(45) Date of Patent: Dec. 11, 2001

(54) LINEAR GUIDE DEVICE

(75) Inventors: Arihiro Fujiwara, Yamatokoriyama; Kazuo Tsuru, Nara, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/418,600

(22) Filed: Oct. 15, 1999

(30) Foreign Application Priority Data

Oct. 16, 1998 (JP) ................................. 10-295258

(51) Int. Cl.$^7$ ................................................ F16C 29/06
(52) U.S. Cl. ................................................ 384/13; 384/45
(58) Field of Search ........................... 384/45, 44, 43, 384/13; 464/168

(56) References Cited

U.S. PATENT DOCUMENTS 3,844,628    10/1974    McCloskey .
5,980,111  * 11/1999    Sasaki ........................... 384/45

FOREIGN PATENT DOCUMENTS 8-240223    9/1996    (JP) .

* cited by examiner

*Primary Examiner*—Lenard A. Footland
(74) *Attorney, Agent, or Firm*—Jacobson Holman, PLLC

(57) ABSTRACT

The life of a linear guide device which can be employed in an environment where high cleanness or oil free is required is prolonged by using a solid lubricating agent.

In order to attain the object, in a linear guide device comprising a guide rail, and a movable unit consisting of: a movable block which is disposed with straddling the guide rail; and balls (rolling elements) which are enclosed in a ball circulation passage disposed in the movable block, at least ball raceway surfaces of the guide rail and the movable unit are coated with a solid lubricating agent, and the clearance between the guide rail and the movable unit is 0 or positive. Although a solid lubricating agent which is susceptible to be affected by a load is used, therefore, the life of the device can be prolonged as compared with the case where a negative clearance is employed.

3 Claims, 4 Drawing Sheets

LINEAR GUIDE DEVICE

BACKGROUND OF THE INVENTION

The invention relates to a linear guide device, and particularly to a linear guide device that is suitably employed in, for example, a semiconductor producing apparatus in which usual grease or a lubricating oil cannot be used.

Conventionally, a linear guide device having the following configuration is known (for example, Japanese Patent Publication (Kokai) No. HEI5-248433). The linear guide device has a linear guide rail and a movable unit which is moved along the guide rail. The movable unit is configured by: a movable block in which leg portions are arranged in a lateral direction with respect to the moving direction, and which is disposed with straddling the guide rail; and plural rolling elements which, while circulating in rolling element circulation passages formed in the right and left leg portions of the movable block, roll between a rolling element raceway surface formed in the circulation passage, and other rolling element raceway surfaces respectively formed on both the sides of the guide rail.

In a linear guide device of such a type, usually, grease is used for lubrication between the rolling elements, and the guide rail and the movable block. The device is used in a state where the clearance between the guide rail and the movable unit and in a direction perpendicular to the moving direction is formed as a negative clearance, or a preload is applied between the movable block and the guide rail via the rolling elements.

When such a linear guide device is employed in an environment where high cleanness or oil free is required, such as in a semiconductor producing apparatus, usual grease or a lubricating oil cannot be used, and hence at least rolling element contact surfaces (raceway surfaces) of the guide rail and the movable block must be coated with a solid lubricating agent.

When a solid lubricating agent is used in a linear guide device, the life (dust evolution and torque life) of the device is more easily affected by a load as compared with the case where grease is used. As described above, a linear guide device of this type is used with being applied with a preload and forming a negative clearance. Therefore, the device is always in a state where a relatively large load is acting on the device, thereby producing a problem in that the device has a short life.

SUMMARY OF THE INVENTION

The invention has been conducted in order to solve the problems. It is an object of the invention to provide a linear guide device in which a solid lubricating agent can be used so that the device can be employed in an environment where high cleanness or oil free is required, and which has a long life.

In order to attain the object, the linear guide device of the invention is a linear guide device comprising a linear guide rail, the movable unit which is moved along the guide rail, the movable unit comprising: a movable block which has right and left leg portions in a lateral direction with respect to the moving direction, which is disposed with straddling the guide rail, and in which a rolling element circulation passage is formed in each of the right and left leg portions; and plural rolling elements which, while circulating in corresponding one of the rolling element circulation passages of the movable block, roll between a rolling element raceway surface formed in the circulation passage, and rolling element raceway surfaces respectively formed on both the sides of the guide rail, and characterized in that at least the rolling element raceway surfaces of the guide rail and the rolling element raceway surfaces of the rolling element circulation passages are coated with a solid lubricating agent, and a clearance between the guide rail and the movable unit and in a direction perpendicular to the moving direction (hereinafter, such a clearance is referred to merely as "clearance") is 0 or positive.

In the invention, a fluororesin or molybdenum disulfide is preferably used as the solid lubricating agent.

The invention has been conducted based on results of various experiments on a linear guide device in which a solid lubricating agent is used. Unlike the case where usual grease or the like is used as a lubricating agent, the clearance is not formed as a negative clearance. When a solid lubricating agent is used, the clearance is set to be 0 or positive, whereby the life of the linear guide device can be largely prolonged.

According to results of experiments, when a solid lubricating agent is used for lubrication between the rolling elements, and the guide rail and the movable block, in the case where the clearance between the guide rail and the movable unit is positive or +6 $\mu$m, the life is prolonged two times as compared with the case of a negative clearance of −6 $\mu$m which is frequently employed in a linear guide device of this type wherein usual grease is used as a lubricating agent.

In the invention, the lower limit of the clearance is 0, and the upper limit is the maximum clearance which can satisfy requirements on the accuracy of positioning and that of rattling that are allowable in a linear guide device. A more preferable range of the clearance depends on the kind of the solid lubricating agent, the application thickness, the size of the rolling elements, and the like, and cannot be clearly specified at present. In the case where PFPE (perfluoropolyether), PTFE (polytetrafluoroethylene), or molybdenum disulfide is used in a coating thickness on the order of submicrons, excellent results are obtained when the clearance is in the range of 0 to about +10 $\mu$m.

DETAILED DESCRIPTION OF THE PREFERRED EMBODIMENTS

Figure 1:
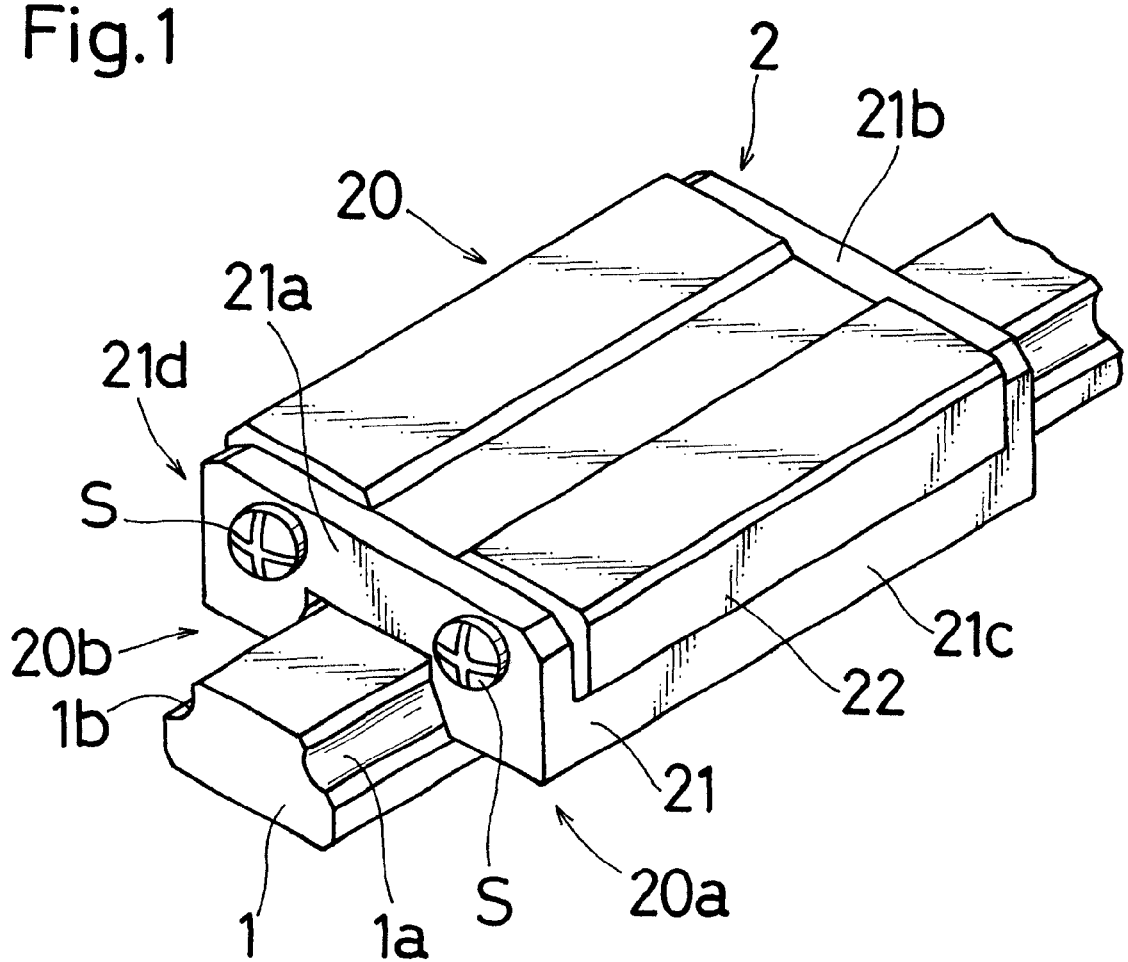
FIG. 1 is an external perspective view showing the whole configuration of an embodiment of the invention.
Figure 2:
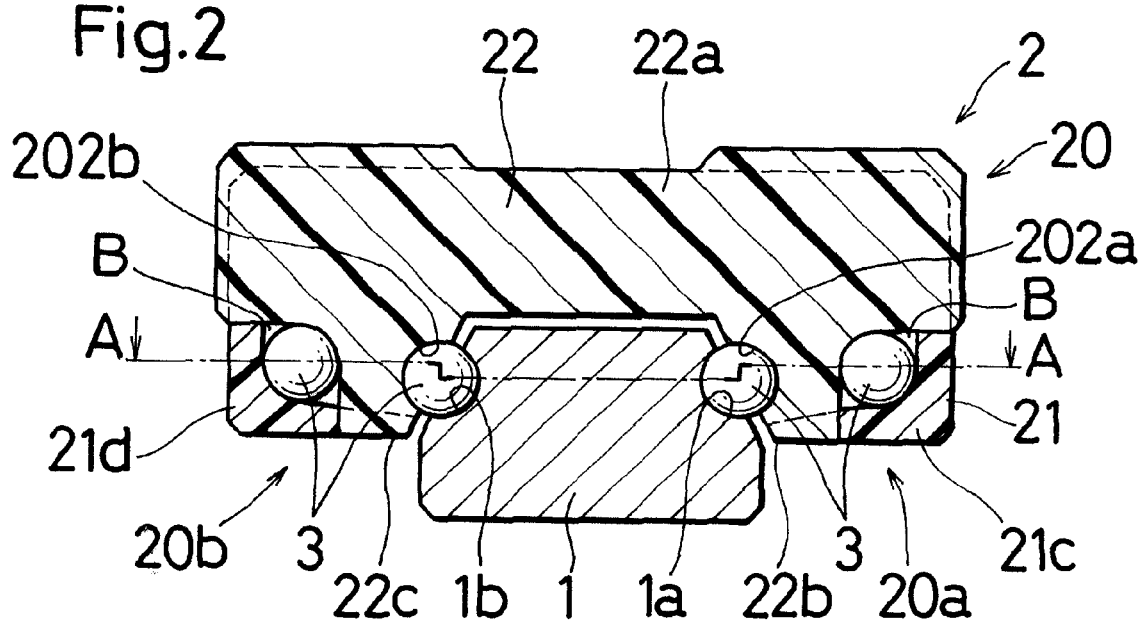
FIG. 2 is a longitudinal section view of the embodiment of the invention.
Figure 3:
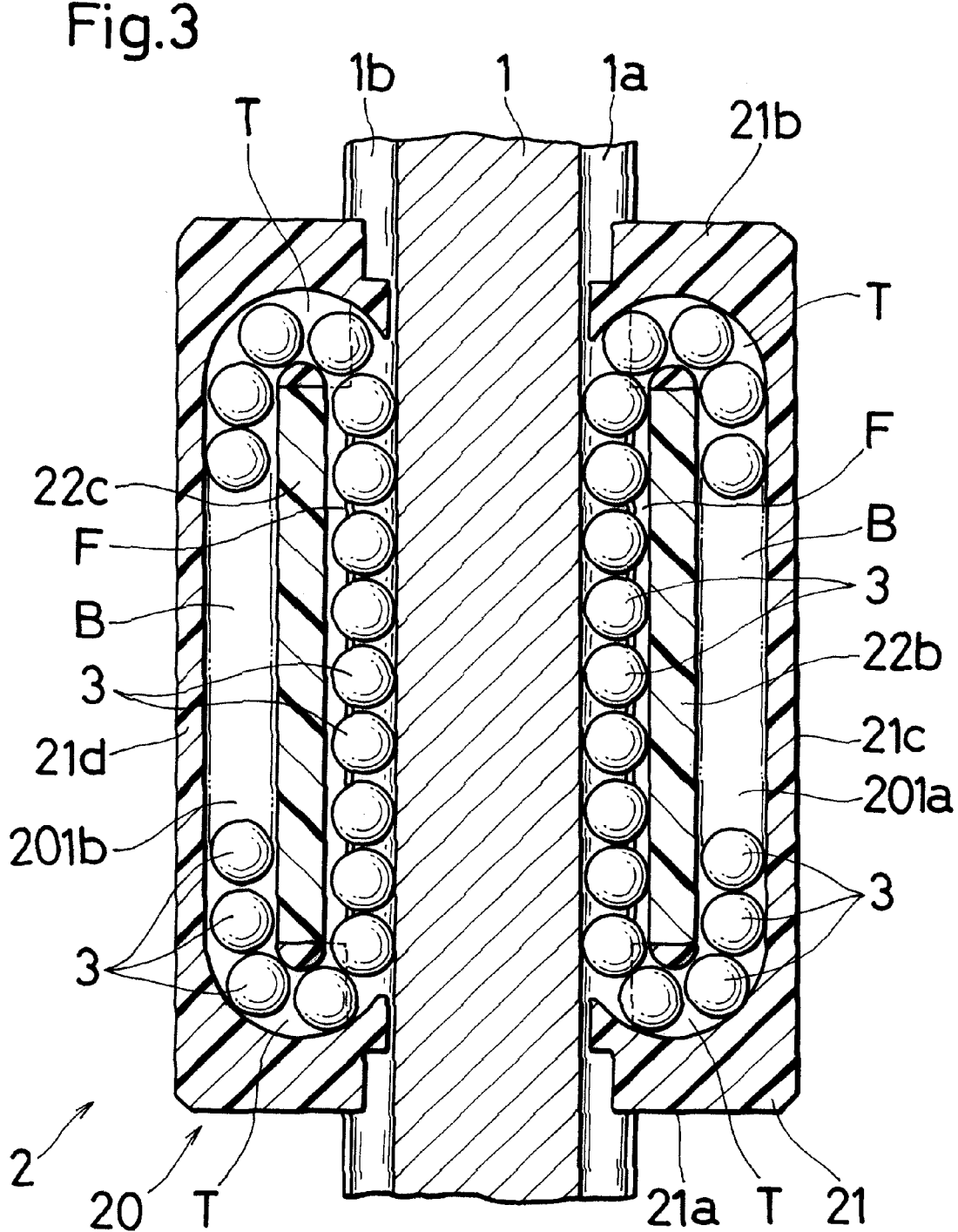
FIG. 3 is a section view taken along A—A of FIG. 2.

Hereinafter, a preferred embodiment of the invention will be described. FIG. 1 is a perspective view of an embodiment of the invention, FIG. 2 is a longitudinal section view of the embodiment, FIG. 3 is a section view taken along A—A of FIG. 2.

In a guide rail 1, the section perpendicular to the longitudinal direction of the rail has a substantially trapezoidal shape. In the shoulder portions of the rail, ball raceway surfaces 1a and 1b each configured by an arcuate face are formed so as to elongate in parallel with each other and in the longitudinal direction, respectively.

A movable unit 2 consists of a movable block 20 and plural balls 3 serving as rolling elements. The movable block 20 is configured by integrating together first and second members 21 and 22 made of a synthetic resin with screws S, and has leg portions 20a and 20b which are respectively on the right and left sides. As a whole, the movable unit is disposed with straddling the guide rail 1. Ball circulation passages 201a and 201b are formed in the leg portions 20a and 20b, respectively. The plural balls 3 are enclosed in each of the ball circulation passages 201a and 201b.

Each of the ball circulation passages 201a and 201b is configured by: a forward passage F which is opposed to the corresponding one of the ball raceway surfaces 1a and 1b on the right and left sides of the guide rail 1; a backward passage B which elongates in parallel with and outside the forward passage F; and arcuate reverse passages T through which the respective ends of the forward and backward passages F and B communicate with each other. In the ball circulation passages 201a and 201b, the forward passages F are formed by arcuate faces which are opposed to the ball raceway surfaces 1a and 1b of the guide rail 1, so as to constitute ball raceway surfaces 202a and 202b of the movable block 20, respectively. Namely, the movable block 20 and an external load acting thereon are received by the ball raceway surfaces 1a and 1b of the guide rail 1, via the ball raceway surfaces 202a and 202b of the movable block 20 and the balls 3 existing thereon. When the movable unit 2 is moved, the balls 3 roll between the ball raceway surfaces 1a and 202a, and 1b and 202b which are opposed to each other.

The first member 21 of the movable block 20 is configured by: end cap portions 21a and 21b which are disposed in the ends of the member and in which the reverse passages T are formed; and connecting portions 21c and 21d through which side ends of the end cap portions are connected to each other. The second member 22 is configured by: a main part 22a; and two ridges 22b and 22c which downward protrude from the lower face of the main part 22a so as to straddle the guide rail 1. The leg portions 20a and 20b are configured by the connecting portions 21c and 21d of the first member 21, and the ridges 22b and 22c of the second member 22. The ball raceway surfaces 202a and 202b of the movable block 20 are formed on side faces of the two ridges 22b and 22c of the second member 22 on the side of the guide rail 1. The other side faces of the ridges 22b and 22c cooperate with the inner side faces of the right and left connecting portions 21c and 21d of the first member 21, to form the backward passages B.

The above-described basic configuration is known in above-mentioned Japanese Patent Publication (Kokai) No. HEI5-248433. When the movable unit 2 is moved along the guide rail 1, the balls 3 roll between the ball raceway surfaces 1a and 1b of the guide rail 1 and the ball raceway surfaces 202a and 202b of the movable block 20, while circulating in the ball circulation passages 201a and 201b of the movable block 20, thereby reducing friction in the movement of the movable unit 2 along the guide rail 1.

The embodiment is characterized in that at least the ball raceway surfaces 1a and 1b of the guide rail 1 and the ball raceway surfaces 202a and 202b of the movable block 20 are coated with a thin film made of a solid lubricating agent, for example, a fluororesin such as PFPE (perfluoropolyether) or PTFE (polytetrafluoroethylene), or molybdenum disulfide, and also that the clearance between the guide rail 1 and the movable unit 2 (the clearance perpendicular to the longitudinal direction of the guide rail 1) is a positive clearance of +6 μm. According to this configuration, the device can be employed in an environment where high cleanness or oil free is required, such as in a semiconductor producing process. As shown in the experimental results described later, moreover, the life of the device can be largely prolonged as compared with a device which has the same structure, and in which the same solid lubricating agent is used and, in the same manner as the prior art, a negative clearance is formed.

Devices were produced so as to have the structure shown in FIGS. 1 to 3. In the devices, the ball raceway surfaces 1a, 1b, 202a, and 202b were coated with a solid lubricating agent. While changing only the clearance between the guide rail 1 and the movable unit 2, the life was actually measured. One of the devices subjected to the experiment is the above-described embodiment of the invention and has a positive clearance of +6 μm (±2 μm), and the other one is a comparative example having a negative clearance of −6 μm (±2 μm) which is frequently employed in a linear guide device of this type. Results of the experiment are shown in the form of a bar graph in FIG. 4. In this specification, the life means a timing when dust evolution exceeds an allowable limit, or that when the force required for moving the movable unit 2 exceeds an allowable limit (torque life).

Figure 4:
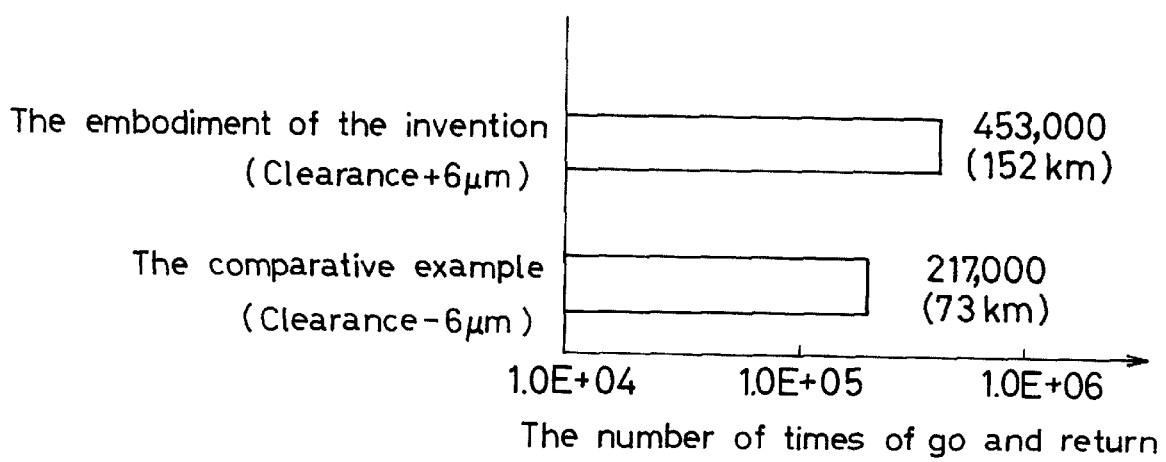
FIG. 4 is a bar graph showing results of life tests conducted on the embodiment of the invention, and a comparative example in which a solid lubricating agent and a negative clearance are employed.

As seen from FIG. 4, the life of the embodiment of the invention in which a positive clearance is employed is prolonged two or more times as compared with the comparative example in which a negative clearance is employed in the same manner as the prior art.

In the embodiment, only the ball raceway surfaces 1a, 1b, 202a, and 202b are coated with a solid lubricating agent. Alternatively, also the faces contacting with the balls 3, i.e., the backward and reverse passages of the ball circulation passages 201a and 201b may be coated with a solid lubricating agent.

The clearance between the guide rail 1 and the movable unit 2 is not restricted to +6 μm and may be set as a positive clearance of any positive value including and larger than 0. The upper limit of the clearance may be set to the maximum clearance which can satisfy requirements on the allowable accuracy of rattling and that of movement. The clearance may be a positive clearance of any value between these values.

As described above, according to the invention, in a linear guide device comprising: a linear guide rail on which rolling element raceway surfaces are formed; and a movable unit which comprises: a movable block which is disposed with straddling the guide rail, and which has a rolling element circulation passage; and rolling elements which are enclosed in the element circulation passage, at least the rolling element raceway surfaces of the guide rail and the rolling element raceway surface of the rolling element circulation passage are coated with a solid lubricating agent, for example, a lubricative fluororesin such as PFPE or PTFE, or molybdenum disulfide, and a clearance between the guide rail and the movable unit is 0 or positive. As a result, the device can be employed in an environment where high cleanness or oil free is required, such as in a semiconductor producing process. Moreover, the life of the device can be largely prolonged as compared with the case in which a negative clearance which is frequently employed in a linear guide device of this type and a solid lubricating agent is formed is used.

What is claimed is:

1. A linear guide device for a semiconductor producing apparatus having a linear guide rail, and a movable unit which is moved along said guide rail, said movable unit comprising:

a movable block having right and left leg portions, said right and left leg portions being positioned in a lateral direction with respect to the moving direction, which is disposed with straddling said guide rail, and a rolling element circulation passage formed in each of said right and left leg portions;

a plurality of rolling elements for circulating in corresponding one of said rolling element circulation passages of said movable block;

a rolling element raceway surface formed in said circulation passage for rolling said plurality of rolling elements; and rolling element raceway surfaces respectively formed on both sides of said guide rail;

a solid lubricating agent for coating said rolling element raceway surfaces of the guide rail and the rolling element raceway surfaces of said rolling element circulation passages; and said guide rail and said movable unit forming a clearance in a direction perpendicular to the moving direction and said clearance is from 0 to +10 μm.

2. The linear guide device according to claim 1, wherein said solid lubricating agent is a fluororesin.

3. The linear guide device according to claim 1, wherein said solid lubricating agent is a molybdenum disulfide.

* * * * *